(12) United States Patent
Diard

(10) Patent No.: US 7,383,412 B1
(45) Date of Patent: Jun. 3, 2008

(54) ON-DEMAND MEMORY SYNCHRONIZATION FOR PERIPHERAL SYSTEMS WITH MULTIPLE PARALLEL PROCESSORS

(75) Inventor: Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 241 days.

(21) Appl. No.: 11/069,163

(22) Filed: Feb. 28, 2005

(51) Int. Cl.
*G06F 12/00* (2006.01)
(52) U.S. Cl. .................. 711/170; 711/171; 711/172; 711/173
(58) Field of Classification Search .................. None
See application file for complete search history.

(56) References Cited

U.S. PATENT DOCUMENTS

| | | | |
|---|---|---|---|
| 5,642,495 A * | 6/1997 | Ammann et al. | .......... 711/153 |
| 5,790,130 A | 8/1998 | Gannett | |
| 5,841,444 A | 11/1998 | Mun | |
| 6,023,281 A | 2/2000 | Grigor et al. | |
| 6,078,339 A | 6/2000 | Meinerth et al. | |
| 6,191,800 B1 | 2/2001 | Arenburg et al. | |
| 6,259,461 B1 | 7/2001 | Brown | |
| 6,317,133 B1 | 11/2001 | Root et al. | |
| 6,362,818 B1 | 3/2002 | Gardiner et al. | |
| 6,445,391 B1 | 9/2002 | Sowizral et al. | |
| 6,469,746 B1 | 10/2002 | Maida | |
| 6,473,086 B1 | 10/2002 | Morein et al. | |
| 6,570,571 B1 | 5/2003 | Morzumi | |
| 6,724,390 B1 | 4/2004 | Dragony et al. | |
| 6,747,654 B1 | 6/2004 | Laksono et al. | |
| 6,781,590 B2 | 8/2004 | Katsura et al. | |
| 2003/0088752 A1* | 5/2003 | Harman | ...................... 711/202 |
| 2003/0128216 A1 | 7/2003 | Walls et al. | |
| 2004/0075623 A1 | 4/2004 | Hartman | |
| 2005/0012749 A1 | 1/2005 | Gonzalez | |
| 2005/0088445 A1 | 4/2005 | Gonzalez | |

OTHER PUBLICATIONS

Whitman, "Dynamic Load Balancing For Parallel Polygon Rendering" IEEE Computer Graphics and Applications, IEEE Inc. New York, U.S. vol. 14, No. 4, pp. 41-48, Jul. 1, 1994.

* cited by examiner

*Primary Examiner*—Kevin L. Ellis
*Assistant Examiner*—Mehdi Namazi
(74) *Attorney, Agent, or Firm*—Townsend and Townsend and Crew LLP

(57) ABSTRACT

On-demand memory synchronization is provided for peripheral subsystems, including graphics systems, that include multiple co-processors operating in parallel. A region of master memory (memory associated with one of the peripheral co-processors) is copied, on demand, to a corresponding region of a different memory associated with another of the peripheral co-processors using a direct memory access operation that does not involve a CPU.

22 Claims, 5 Drawing Sheets

ON-DEMAND MEMORY SYNCHRONIZATION FOR PERIPHERAL SYSTEMS WITH MULTIPLE PARALLEL PROCESSORS

CROSS-REFERENCES TO RELATED APPLICATIONS

The present disclosure is related to the following commonly-assigned co-pending U.S. patent applications:
application Ser. No. 10/789,248, filed Feb. 27, 2004, entitled "Graphics Device Clustering with PCI-Express";
application Ser. No. 10/650,593, filed Aug. 27, 2003, entitled "On-Demand Memory Management";
application Ser. No. 10/990,712, filed Nov. 17, 2604, entitled "Connecting Graphics Adapters for Scalable Performance"; and
Application Ser. No. 11/012,394, filed Dec. 15, 2004, entitled "Broadcast Aperture Remapping for Multiple Graphics Adapters."

The respective disclosures of these applications are incorporated herein by reference for all purposes.

BACKGROUND OF THE INVENTION

The present invention relates in general to memory management, and in particular to on-demand memory synchronization for a peripheral system with multiple parallel processors.

Graphics processing subsystems are designed to render realistic animated images in real time, e.g., at 30 or more frames per second. These subsystems are most often implemented on expansion cards that can be inserted into appropriately configured slots on a motherboard of a computer system and generally include one or more dedicated graphics processing units (GPUs) and dedicated graphics memory. The typical GPU is a highly complex integrated circuit device optimized to perform graphics computations (e.g., matrix transformations, scan-conversion and/or other rasterization techniques, texture blending, etc.), write the resulting pixels to the graphics memory, and deliver the pixels in real time to a display device. The GPU is a "slave" processor that operates in response to commands received from a driver program executing on a "master" processor, generally the central processing unit (CPU) of the system.

To meet the demands for realism and speed, some GPUs include more transistors than typical CPUs. In addition, graphics memories have become quite large in order to improve speed by reducing traffic on the system bus; some graphics cards now include as much as 256 MB of memory. But despite these advances, a demand for even greater realism and faster rendering persists.

As one approach to meeting this demand, some manufacturers have begun to develop "multi-chip" (or multi-processor) graphics processing subsystems in which two or more GPUs, usually on the same card, operate in parallel. Parallel operation substantially increases the number of rendering operations that can be carried out per second without requiring significant advances in GPU design. To minimize resource conflicts between the GPUs, each GPU is generally provided with its own dedicated memory area, including a display buffer to which the GPU writes pixel data it renders.

In a multi-chip system, two or more GPUs can be operated to render images cooperatively for the same display device; in this "distributed" rendering mode, rendering tasks are distributed among the GPUs. Tasks may be distributed in various ways. For example, in a "split frame rendering" (SFR) mode, each GPU is instructed to render pixel data for a different portion of the displayable image, such as a number of lines of a raster-based display. The image is displayed by scanning out the pixel data from each GPU's display buffer in an appropriate sequence. As another example, in an "alternate frame rendering" (AFR) mode, each GPU is instructed to render pixel data for a different image in a temporal sequence (e.g., different frames of an animated image such as a 3D video game). In this mode, a smooth animation speed of about 30 frames per second can be provided by two GPUs that each render images at 15 Hz.

Multi-chip graphics systems present a variety of problems, among which is high demand for memory bandwidth. In a multiprocessor system, each GPU is usually provided with a separate memory in order to avoid memory access conflicts between the GPUs. Each memory must be loaded with the scene data (geometry, lighting, textures, etc.) and rendering commands for the image. In conventional systems, the CPU communicates rendering commands and data to each GPU (or its memory) separately over a CPU bus. Thus, the bandwidth required to operate multiple GPUs scales linearly with the number of GPUs. For complex scenes requiring extensive vertex data, operating even two GPUs in parallel would saturate the CPU bus, and no performance advantage would be obtained from having multiple GPUs. In addition, requiring the CPU to communicate the same rendering commands and data multiple times wastes CPU cycles.

One solution, described in above-referenced application Ser. No. 10/789,248, is to provide a "broadcast bridge" and memory-mapped I/O (input/output) operations. As is known in the art, in memory mapped I/O, commands and data written by the CPU to a predetermined range of memory addresses are communicated to a peripheral device (e.g., the graphics subsystem), and read operations by the CPU that access the predetermined range of memory addresses result in reading data from the peripheral device. The broadcast bridge is configured to recognize a certain range of memory addresses as a "broadcast aperture" and to distribute to all of the GPUs any commands and data written by the CPU to an address in the broadcast aperture.

The broadcast bridge solves the problem of duplicative CPU communications, provided that suitable supporting hardware is available, e.g., in one or more of the GPUs, in the system chipset, or elsewhere in a communication path between the CPU and the GPUs. In some systems, however, suitable supporting hardware is not present, and an efficient technique for distributing data and commands to multiple GPUs in the absence of a broadcast bridge is therefore desirable.

BRIEF SUMMARY OF THE INVENTION

Embodiments of the present invention provide on-demand memory synchronization for peripheral subsystems, including graphics systems, that include multiple co-processors operating in parallel. A region of memory associated with one of the peripheral co-processors can be copied, on demand, to a corresponding region of memory associated with another of the peripheral co-processors. Direct memory access (DMA) operations between the memories are advantageously used, and duplicative communication of the same data by the CPU is advantageously avoided.

According to one aspect of the present invention, in a computer system, a method is provided for managing memory in a peripheral processing subsystem, where the peripheral processing subsystem includes a number of peripheral co-processors and a number of memories, each memory being associated with a different one of the peripheral co-processors. One of the memories is selected as a master memory, the master memory being associated with a first one of the peripheral co-processors. A region of the master memory is identified as being modifiable by a process executing on a central processor of the computer system. Completion of a modification to the modifiable region is detected, and in response to detecting completion, a transfer of data is initiated to transfer data in the modifiable region of the master memory to a corresponding region of a second memory associated with a second one of the peripheral co-processors. The peripheral processing subsystem may be, e.g., a graphics processing subsystem.

In some embodiments, the modifiable region may include multiple pages of memory. The act of initiating a transfer of data may include initiating a transfer of the data for all of the pages in the modifiable region, or it may include determining which of the plurality of pages were modified by the modification and selectively initiating a transfer of the data for the modified pages. Initiating the transfer may include, e.g., instructing a DMA controller of the computer system to perform a block transfer from the modifiable region of the master memory to the corresponding region of the second memory.

In some embodiments, identifying the modifiable region may include receiving a lock command from the process executing on the central processor, the lock command including a reference to the modifiable region of the master memory, and detecting completion of the modification may include receiving an unlock command from the process executing on the central processor, the unlock command including a reference to the modifiable region of the master memory. In response to the lock command, the first peripheral co-processor may be instructed to postpone accessing the modifiable region of the master memory, and in response to the unlock command, the first peripheral processor may be instructed to stop postponing accessing the modifiable region of the master memory.

In some embodiments, prior to identifying the region, the modifiable region of the master memory is mapped to a virtual memory space, thereby enabling direct access by the process executing on the central processor to the modifiable region. In other embodiments, the act of identifying the region includes mapping the modifiable region of the master memory to a virtual memory space, thereby enabling direct access by the process executing on the central processor to the modifiable region. In either case, the corresponding region of the second memory might not be mapped to the virtual memory space.

According to another aspect of the present invention, a peripheral subsystem for a computer system includes multiple peripheral co-processors operable in parallel, a master memory associated with a first one of the peripheral co-processors, a second memory associated with a second one of the peripheral co-processors, and a driver module. The driver module, which is configured to enable communication between a process executing on a central processor of the computer system and the peripheral co-processors, includes a memory management unit configured to manage the master memory and the second memory in response to memory commands received from the process. The memory management unit is configured to enable the process to access a modifiable region of the master memory and to initiate a direct data transfer from the modifiable region of the master memory to a corresponding region of the second memory.

According to still another aspect of the invention, a computer program product includes a computer readable medium encoded with program code for managing memory in a peripheral processing subsystem including multiple peripheral co-processors and multiple peripheral memories, each memory being associated with a different one of the peripheral co-processors. The program code includes program code for selecting one of the plurality of peripheral memories as a master memory, the master memory being associated with a first one of the plurality of peripheral co-processors; program code for identifying a region of the master memory as being modifiable by a process executing on a central processor of the computer system; program code for detecting completion of a modification to the modifiable region; and program code for initiating, in response to detecting completion, a transfer of data in the modifiable region of the master memory to a corresponding region of a second memory associated with a second one of the peripheral co-processors.

The following detailed description together with the accompanying drawings will provide a better understanding of the nature and advantages of the present invention.

DETAILED DESCRIPTION OF THE INVENTION

Embodiments of the present invention provide on-demand memory synchronization for peripheral subsystems, including graphics systems, that include multiple co-processors operating in parallel. A region of memory associated with one of the peripheral co-processors can be copied, on demand, to a corresponding region of memory associated with another of the peripheral co-processors. Direct memory access (DMA) operations between the memories are advantageously used, and duplicative communication of the same data by the CPU is advantageously avoided.

System Overview

Figure 1:
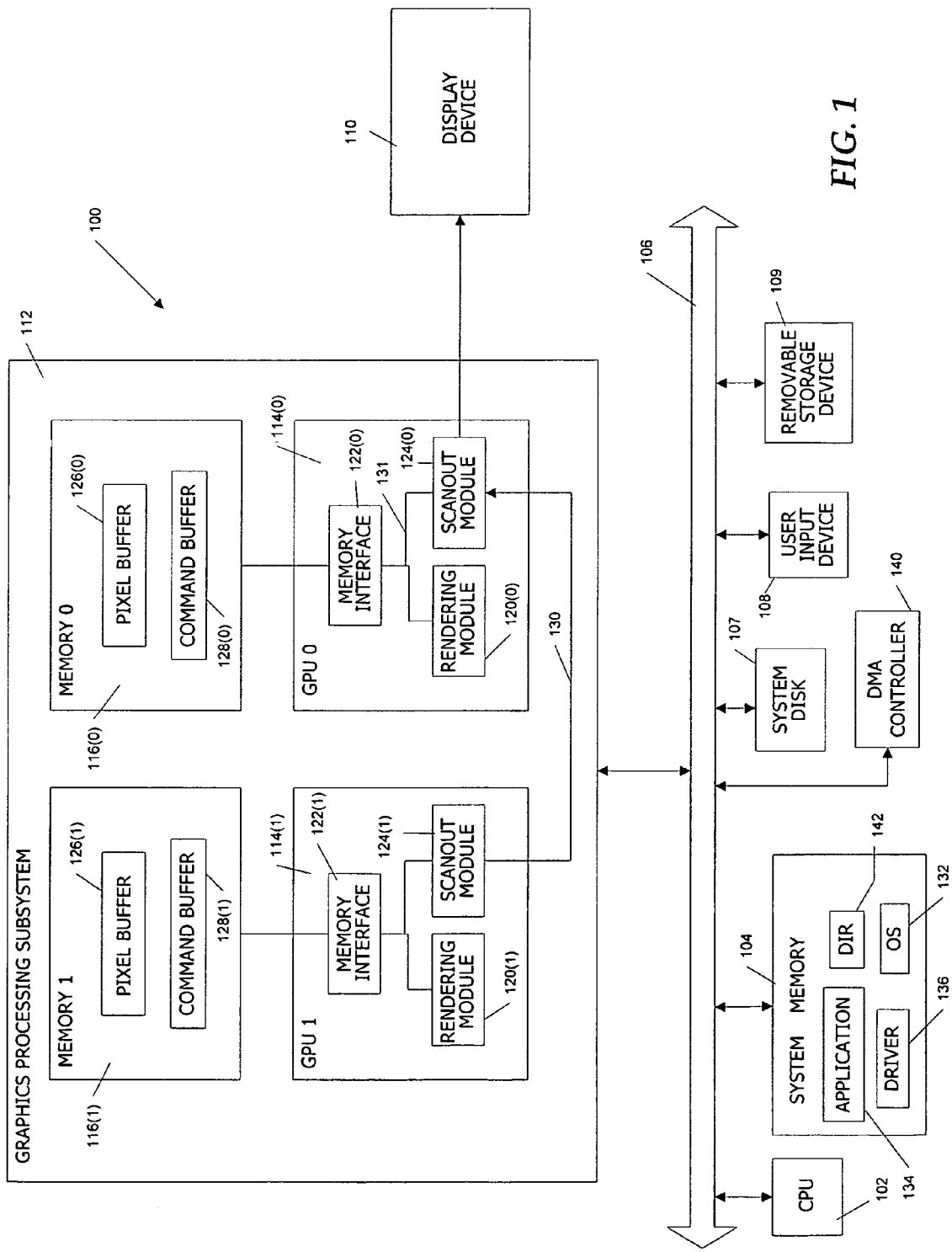
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110

(e.g., a conventional CRT or LCD based monitor) operating under control of a graphics processing subsystem 112 coupled to system bus 106. A system disk 107 and other components, such as one or more removable storage devices 109 (e.g., floppy disk drive, compact disk (CD) drive, and/or DVD drive), may also be coupled to system bus 106.

Graphics processing subsystem 112 includes two (or more) graphics processing units (GPUs) 114, each with its own graphics memory 116. (Herein, multiple instances of like objects are identified by the same reference number, with parenthetical instance identifiers where appropriate.) GPUs 114 and memories 116 may be implemented, e.g., using one or more integrated circuit devices such as programmable processors, application specific integrated circuits (ASICs), and memory devices. In one embodiment, graphics processing subsystem 112 is implemented using one or more expansion cards adapted to be connected to an appropriate bus slot (e.g., PCI-E) on a motherboard of system 100.

Each of GPUs 114 includes a rendering module 120, a memory interface module 122, and a scanout module 124. Rendering modules 120 may be configured to perform various tasks related to generating pixel data from graphics data supplied via system bus 106 (e.g., implementing various 2-D and or 3-D rendering algorithms), interacting with respective graphics memories 116 to store and update pixel data, and the like. Rendering modules 120 are advantageously configured to generate pixel data from 2-D or 3-D scene data provided by various programs executing on CPU 102. Rendering modules 120 are advantageously configured identically so that a given rendering instruction can be executed by either of the rendering modules 120(0) or 120(1) with substantially identical results, although this is not required. The particular configuration of rendering modules 120 may be varied as desired, and a detailed description is omitted as not being critical to understanding the present invention.

Memory interface modules 122, which communicate with respective rendering modules 120 and scanout modules 124, manage all interactions with respective graphics memories 116. Each memory interface module 122 may also include pathways for writing pixel data received from system bus 106 to the respective graphics memory 116 without processing by rendering module 120. The particular configuration of memory interface modules 122 may be varied as desired, and a detailed description is omitted as not being critical to understanding the present invention.

Graphics memories 116, which may be implemented using one or more integrated circuit memory devices of generally conventional design, may each contain various physical or logical subdivisions, such as a pixel buffer 126 and a command buffer 128. Each pixel buffer 126 stores pixel data for an image (or for a part of an image) that is read and processed by the respective scanout module 124 and transmitted to display device 110 for display. This pixel data may be generated, e.g., from 2-D or 3-D scene data provided to rendering modules 120 of GPUs 114 via system bus 106 or generated by various processes executing on CPU 102 and provided to one or more of pixel buffers 126 via system bus 106. Pixel buffers 126 may each be double buffered so that while data for a first image is being read for display from a front frame buffer, data for a second image can be written to a back frame buffer without affecting the currently displayed image.

Command buffers 128 are used to queue commands received via system bus 106 for execution by respective rendering modules 120 and/or scanout modules 124, as described below. Other portions of graphics memories 116 may be used to store data required by GPUs 114 (such as texture data, color lookup tables, etc.), executable program code for GPUs 114, and so on.

Scanout modules 124 read pixel color data from pixel buffers 126 and transfer the data to display device 110 to be displayed. In one embodiment, scanout modules 124 operate isochronously, scanning out frames of pixel data at a prescribed refresh rate (e.g., 80 Hz) regardless of any other activity that may be occurring in GPUs 114 or elsewhere in system 100. In some embodiments, the prescribed refresh rate can be a user selectable parameter, and the scanout order may be varied as appropriate to the display format (e.g., interlaced or progressive scan). Scanout modules 124 may also perform other operations, such as adjusting color values for particular display hardware and/or generating composite screen images by combining the pixel data from pixel buffers 126 with data for a video or cursor overlay image or the like, which may be obtained, e.g., from graphics memory 116, system memory 104, or another data source (not shown). Examples of such scanout operations are known in the art, and a detailed description is omitted as not being critical to understanding the present invention.

In some embodiments, multiple GPUs 114 may be operated in a "distributed rendering" mode. In one such mode, referred to herein as "split-frame rendering" ("SFR"), different GPUs 114 render different portions of the same image. The image portions may correspond to horizontal bands, vertical bands, or other divisions as desired. For example, each GPU 114 may allocate a pixel buffer 126 in its local memory 116 that is large enough to store entire frames of data but only fills pixels corresponding to the lines being rendered by that GPU 114. Scanout is performed in a "daisy-chain" fashion, with GPU 114(0) acting as a master and GPU 114(1) acting as a slave. More specifically, slave scanout module 124(1) advantageously operates as if it were delivering pixels directly to display device 110. The pixels, in fact, are provided as "external" candidate pixels to master scanout module 124(0) via a pixel path 130. In parallel, master scanout module 124(0) obtains a stream of "internal" candidate pixels via path 131. To select between the two candidate pixels for a given screen location, master scanout module 124(0) advantageously includes a pixel multiplexer (not explicitly shown) driven by a suitable control signal. Examples of such pixel selection techniques are described in above-referenced application Ser. No. 10/789,248 and application Ser. No. 11/012,394. A particular implementation of scanout is not critical to the present invention, and other techniques may be substituted for daisy chaining.

Another distributed rendering mode is an "alternate frame rendering mode" (AFR), in which different ones of GPUs 114 may operate in parallel to render different images that are sequentially displayed to create an animated image. For example, GPU 114(0) might render even-numbered frames while GPU 114(1) renders odd-numbered frames. Scanout for AFR may be operated in a daisy-chain fashion as described above, with the control signal being generated such that the internal candidate pixel is selected for all pixels in frames that were rendered by GPU 114(0) and the external candidate pixel is selected for all pixels in frames that were rendered by GPU 114(1).

In some embodiments, GPUs 114 may be also operable in an "independent rendering" mode in which different ones of GPUs 114 may render images for different display devices; the images rendered by different GPUs 114 might or might not be related to each other. It is to be understood that GPUs 114 may be configurable to operate in any of the above or other modes and that a particular operating mode is not critical to the present invention.

In this embodiment, communication between components of graphics processing subsystem 112 and other components of system 100 is managed at least in part through a shared command buffer (not shown in FIG. 1), which may be implemented, e.g., in system memory 104. A data and command stream written to the shared command buffer is delivered via system bus 106 to both GPUs 114, e.g., to memory interfaces 122. Delivery may be via a broadcast to all GPUs 114 or via a daisy chain arrangement in which the command may be received by memory interface 122(0) first, then propagated to memory interface 1222(1). In some embodiments, the data and commands may include subdevice masks indicating that certain data and/or commands should be ignored by one or another of GPUs 114(0), 114(1). GPUs 114(0) and 114(1) may implement proper processing of any broadcast masks.

System 100 may also include a direct memory access (DMA) controller 140, which performs high-speed DMA transactions to transfer data between source and destination storage locations in response to instructions from CPU 102. The source and destination locations may be any physical storage locations in system 100. For example, DMA controller 140 may transfer data between different locations in system memory 104, or between system memory 104 and various peripheral storage locations such as graphics memory 116(0) or 116(1), or between two peripheral storage locations such as graphics memory 116(0) and graphics memory 116(1). DMA controller 140 may be of generally conventional design, implemented in one or more integrated circuit devices, and mounted on a motherboard of system 100.

In system 100, a virtual memory space is implemented using an address directory ("DIR") 142. It is to be understood that, although address directory 142 is shown as residing in system memory 104, at any given time, portions of address directory 142 may be swapped out, e.g., to system disk 107. In some embodiments (e.g., Microsoft Windows NT or XP), each process is provided with its own virtual memory space, a portion of which may be dedicated to shared resources such as the operating system and various device drivers. In other operating systems, the same virtual memory space is partitioned among different processes. It is to be understood that the present invention may be used with any virtual memory scheme, whether global or process-specific.

Address directory 142 may have any desired organization. In one embodiment, CPU 102 provides 4 GB of addressable virtual memory using 32-bit addresses. The virtual memory is organized into pages, e.g., of 4 KB each. Address directory 142 includes a page directory with 1024 entries, each referencing a page table. Each page table has 1024 entries, each of which can be associated with (e.g., contain a physical address of) a 4 KB (4096 bytes) block, or page, of physical storage, which may be located anywhere within system 100. A linear address of a byte of virtual memory can be defined by using 10 of the 32 bits to identify a page directory entry, 10 bits to identify the page table entry within the directory entry to read (thereby identifying a page of physical memory), and 12 bits to identify the offset of the memory location relative to the beginning of the page. Other addressing schemes may also be implemented; as used herein, a page corresponds to the smallest unit of virtual memory that can be mapped, and a page table entry includes any structure used to maintain an association of a page with a physical memory location.

A page of virtual memory can be mapped to a specific physical memory resource, including addressable storage locations in system main memory 104, on system disk 107, in any of graphics memories 116, or in any other system component. At any given time, a particular virtual memory address might or might not be mapped to a physical storage location; in some embodiments, attempts to access a virtual address fail unless the virtual address is mapped. In one embodiment, a mapping is created by modifying the content of a page table entry in address directory 142 to include an identifier of the physical memory location. For instance, the physical memory location may be identified by specifying a base address of the device on which it resides and an offset, or any other unique identifier adapted to the architecture of system 100; appropriate physical address formats for various systems are known in the art. Numerous implementations of virtual address spaces and memory mapping are known in the art (e.g., various versions of the Microsoft Windows 98, Windows operating system), and a detailed description is omitted as not being critical to understanding the present invention.

During operation of system 100, CPU 102 executes various programs that are (temporarily) resident in system memory 104. In one embodiment, these programs include one or more operating system (OS) programs 132, one or more application programs 134, and one or more driver programs 136 for graphics processing subsystem 112. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on-chip instruction cache and/or various buffers and registers), in a page file or memory mapped file on system disk 107, and/or in other storage space.

Operating system programs 132 and/or application programs 134 may be of conventional design. An application program 134 may be, for instance, a video game program that generates graphics data and invokes appropriate rendering functions of GPUs 114 (e.g., rendering modules 120) to transform the graphics data to pixel data. Another application program 134 may generate pixel data and provide the pixel data to graphics processing subsystem 112 for display. It is to be understood that any number of application programs that generate pixel and/or graphics data may be executing concurrently on CPU 102. Operating system programs 132 (e.g., the Graphical Device Interface (GDI) component of the Microsoft Windows operating system) may also generate pixel and/or graphics data to be processed by graphics processing subsystem 112.

Driver program 136 enables communication with graphics processing subsystem 112, including rendering modules 120 and scanout modules 124. Driver program 136 advantageously implements one or more standard application program interfaces (APIs), such as Open GL, or Microsoft D3D for communication with graphics processing subsystem 112; any number or combination of APIs may be supported, and in some embodiments separate driver programs 136 are provided to implement different APIs. By invoking appropriate API function calls, operating system programs 132 and/or application programs 134 are able to instruct driver program 136 to transfer geometry data or pixel data to graphics processing subsystem 112 via system bus 106, to control operations of rendering module 120, to modify state parameters for scanout module 124 and so on. The specific commands and/or data transmitted to graphics processing subsystem 112 by driver program 136 in response to an API function call may vary depending on the implementation of GPU 114, and driver program 136 may also transmit commands and/or data implementing additional functionality (e.g., special visual effects) not controlled by operating system programs 132 or application programs 134.

Command buffers 128(0) and 128(1) queue the commands received via system bus 106 for execution by GPUs 114(0) and 114(1), respectively. More specifically, driver program 136 executing on CPU 102 delivers a command stream for command buffers 128; the stream may include rendering commands and data for rendering modules 120 as well as state or processing commands for scanout modules 124. In some embodiments, command buffers 128 may each include logically or physically separate sections for commands directed to respective rendering modules 120 and commands directed to respective scanout modules 124. In other embodiments, rendering and scanout commands may be intermixed in command buffers 128 and directed to the appropriate pipeline by suitable control circuitry within GPUs 114. Each of command buffers 128 is advantageously implemented as a first in, first out buffer (FIFO) that is written by CPU 102 and read by a respective one of GPUs 114. Reading and writing can occur asynchronously, using techniques known in the art.

In some embodiments, the command stream delivered by driver program 136 may include sub-device masks that cause selected portions of the stream not to be executed. All of the command stream may be written to all command buffers 128, and sub-device masks may be operative during command execution, with a suitable sub-device mask acting as an instruction to one or more of rendering modules 120 and/or scanout modules 124 to skip execution of certain commands. Thus, command buffers 128(0) and 128(1) could be implemented in a single memory accessible to both of GPUs 114(0) and 114(1), e.g., system memory.

In some embodiments, execution of rendering commands by rendering modules 120 is advantageously asynchronous with operation of scanout modules 124. For example, where pixel buffers 126 are each double buffered as mentioned above, rendering modules 120 can freely overwrite the back frame buffers while scanout modules 124 read from the front frame buffers. Thus, rendering modules 120 may read and process commands as they are received. At appropriate times, e.g., when rendering of a new image to the back buffers is complete, front and back buffers for both GPUs 114 may be flipped.

It will be appreciated that the system described herein is illustrative and that variations and modifications are possible. A GPU may be implemented using any suitable technologies, e.g., as one or more integrated circuit devices, and different GPUs of a multi-processor graphics system might or might not be identical in structure, capabilities, and operation. Any or all of the GPUs or other components may be mounted on an expansion card, mounted directly on a system motherboard, or integrated into a system chipset component (e.g., into the "north bridge" chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout module (s) may be integrated with a GPU or provided on a separate chip and may be implemented, e.g., using one or more ASICs, programmable processor elements, other integrated circuit technologies, or any combination thereof.

Further, while two GPUs, with respective memories, are shown, any number of GPUs can be used, and some or all of the GPUs might share a memory. Memory interfaces, rendering modules and scanout modules for a GPU may be implemented in a single integrated circuit device or in separate integrated circuit devices (chips).

Interconnection between the GPUs may also be modified. For instance, a bridge unit might be provided to interconnect GPUs. A bridge unit, which can be in a separate chip or integrated with one of the GPUs, receives incoming data from system bus 106 and distributes it appropriately (e.g., to all GPUs or to those GPUs identified by a sub-device mask). Another bridge unit might be provided to manage selection among candidate pixels during scanout.

Graphics processing subsystems can be implemented using one or more expansion cards adapted for various bus standards, including PCI, PCI-E, AGP and so on. In one embodiment, all of the GPUs are mounted on one expansion card. In another embodiment, different GPUs are mounted on different interconnected expansion cards. The cards may be interconnected using a system bus (e.g., PCI-E), or a special card-to-card connector may be provided. Examples of interconnections and configurations for multi-processor graphics subsystems are described in above-referenced application Ser. No. 10/990,712 and above-referenced application Ser. No. 11/012,394. It is to be understood that the present invention may be practiced in any of these configurations or in any other multi-processor configuration suitable for split-frame rendering.

In addition, graphics processing subsystems embodying the present invention may be incorporated into a variety of devices, including general purpose computer systems, video game consoles and other special purpose computer systems, DVD players, handheld devices such as mobile phones or personal digital assistants, and so on.

Memory-Mapped I/O Overview

System 100 advantageously provides memory mapping between CPU 102 and one of graphics memories 116, e.g., memory 116(0), allowing CPU 102 to access the associated memory 116(0) directly. As is known in the art, memory mapping involves mapping a portion of a virtual address space of CPU 102 to physical addresses associated with a peripheral device, in this case graphics memory 116(0). Mapping associates each virtual address in some range to a specific address in graphics memory 116(0), and all or part of graphics memory 116(0) might be mapped.

Figure 2:
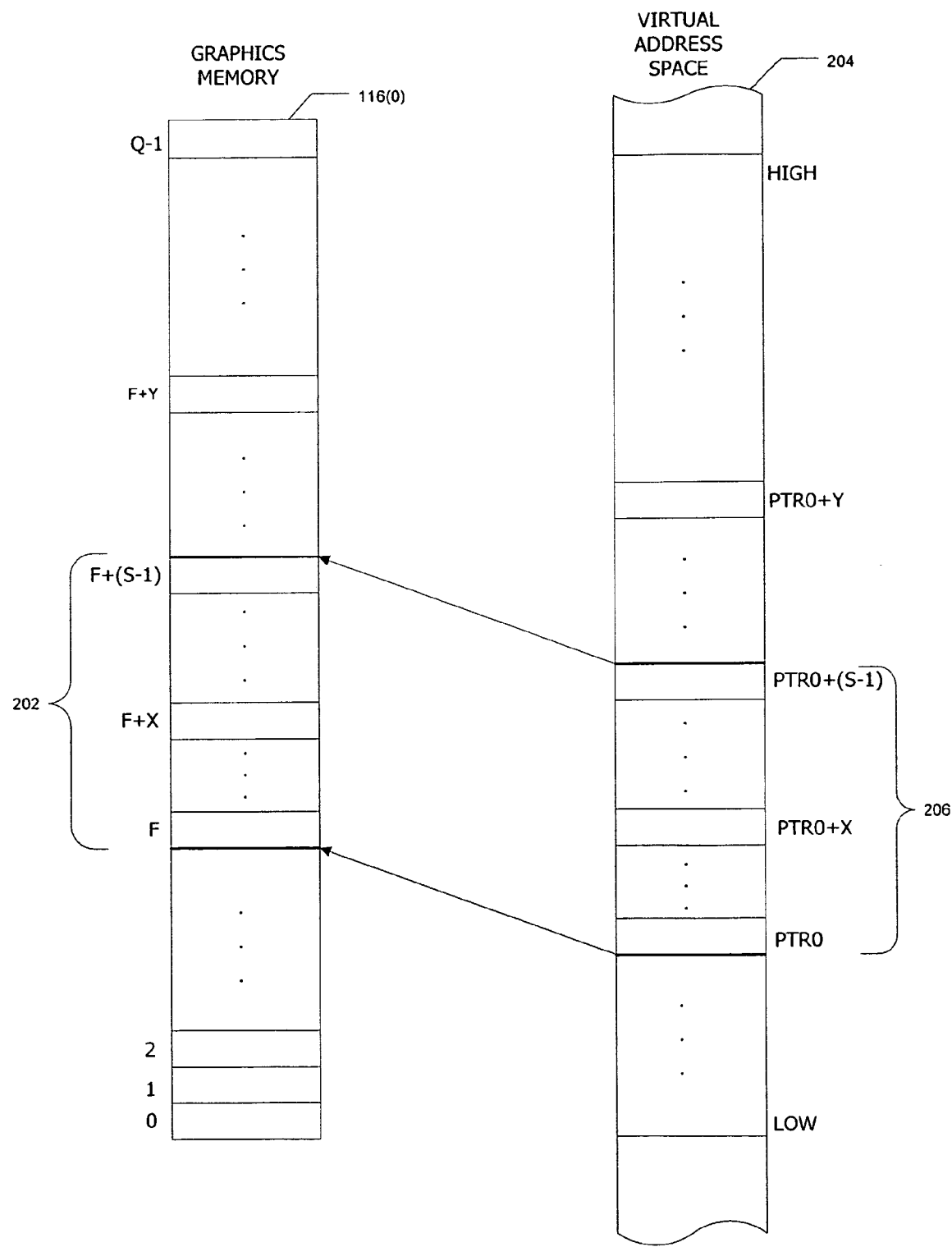
FIG. 2 is an illustration of conventional memory mapping.

FIG. 2 is an illustration of memory mapping. Graphics memory 116(0) is represented in a linear form, with the offsets of addressable storage locations numbered from 0 to Q–1. An addressable location may correspond to a byte or any other convenient unit. A region 202 of size S in graphics memory 116(0) starts at a location F and ends at a location F+(S–1). A portion of a virtual address space 204 is also represented in a linear form, with addresses from "LOW" to "HIGH." This address range may include all or any part of the entire virtual memory space defined in address directory 142 (FIG. 1). It is to be understood that graphics memory 116(0) may include more, fewer, or the same number of addressable storage locations as the number of addresses in virtual memory space 204.

As shown in FIG. 2, a region 206 within virtual address space 204 is mapped to region 202 of graphics memory 116(0). Region 206 starts at a linear address PTR0 and ends at a linear address PTR0+(S–1). It should be noted that there is no particular relationship between the starting location F of region 202 and the starting address PTR0 of region 206. Any memory location F+X, where $0 \leq x \leq (S-1)$, is within region 202 and may be referenced using a virtual address PTR0+X.

In this example, only region 202 of graphics memory 116(0) is mapped to virtual address space 204. Thus, a virtual address PTR0+Y, where $Y>(S-1)$, is not guaranteed to be mapped to location F+Y in graphics memory 116(0) or to any physical memory location at all. Accordingly, program code that access graphics memory 116(0) using virtual addresses from region 206 is advantageously written to ensure that virtual addresses outside the range of region 206 are not accessed.

It will be appreciated that the mapping of FIG. 2 is illustrative, and that any portion of graphics memory 116(0) may be mapped in the manner illustrated. In one embodiment, all of graphics memory 116(0) is mapped to a contiguous range of virtual addresses during device startup. In another embodiment, different portions of graphics memory 116(0) can be dynamically mapped and unmapped on demand, e.g., as described in above-referenced application Ser. No. 10/650,593.

It should be noted that in embodiments described herein, CPU 102 maps only one of graphics memories 116, and that memory is referred to herein as a "master" graphics memory. While graphics memory 116(0) is used herein as the master graphics memory, it is to be understood that any one of graphics memories 116 may be chosen as the master graphics memory, and the "master" graphics memory need not be associated with the same GPU 114 that is designated as "master" for scanout purposes. Other graphics memories 116 might or might not be mapped, depending on how GPUs 114 are being used. For instance, where GPUs 114 operate in an independent rendering mode, mapping at least a portion of each graphics memory 116 may be desirable.

Figure 3:
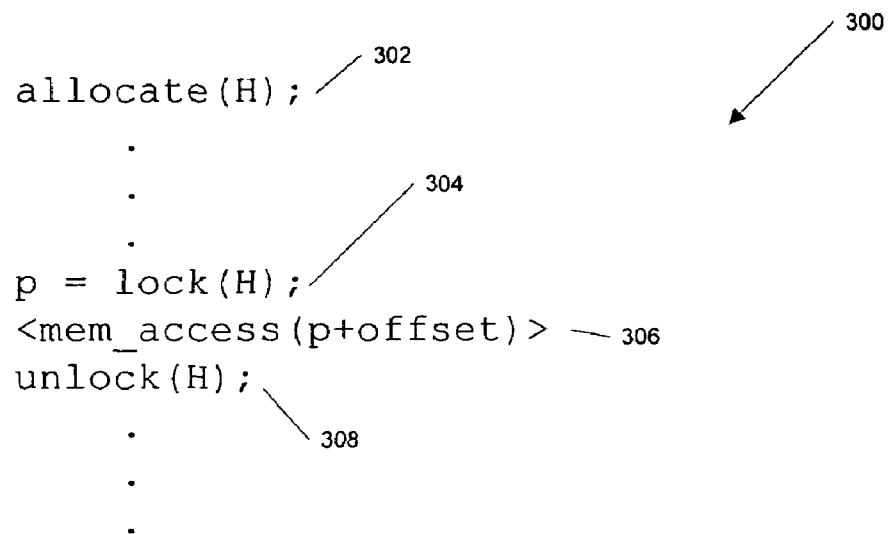
FIG. 3 shows a conventional pseudocode fragment that illustrates the use of memory mapped I/O.

FIG. 3 shows a pseudocode fragment 300 that illustrates the use of memory mapped I/O for a single-GPU system as is known in the art. Fragment 300, which may be included in an application program that uses graphics system functionality, advantageously invokes operations of graphics driver 136 (FIG. 1). The pseudocode of FIG. 3 is based on the D3D API, but those of ordinary skill in the art will recognize that similar operations may be implemented in other APIs. In D3D, memory is identified using a programming object referred to as a "handle." The handle stores information (e.g., type, starting address, range, etc.) about a region of physical memory. For example, the handle may indicate whether the memory is mapped to virtual addresses and, if so, may identify the starting virtual address. Herein, the effect of fragment 300 will be described with reference to system 100 in an operating condition where only GPU 114(0) is active.

An "allocate" command 302 instructs graphics driver 136 to allocate a region of graphics memory 116(0). The argument to the allocate command is a handle H supplied by the application program that specifies the size of the desired region. Upon servicing allocate command 302, graphics driver 136 identifies an unallocated region of graphics memory 116(0) of the desired size (e.g., region 202 of FIG. 2) and modifies the handle H to identify the starting address and any other relevant properties of the identified region. The modified handle H is returned to the application program.

Before accessing the allocated region, the application program instructs the driver to lock the region of memory via a "lock" command 304; the argument H is the handle for the region to be locked. Locking the memory region generally involves preventing GPU 114(0) from accessing that region of graphics memory 116(0); suitable techniques are known in the art. In this embodiment, lock command 304 returns a pointer p for a virtual memory address corresponding to the base location in the region designated by the handle H. In one implementation, the memory mapping (which includes determination of pointer p) is handled dynamically, with the driver mapping the region of memory to virtual memory when a lock command for that region is received. Once a particular region is mapped, the pointer p for that region may be cached for subsequent reuse so that it is not necessary to create a new pointer p if that region is later locked again. Alternatively, the pointer p might not be cached; in this implementation, a virtual memory mapping becomes invalid when the memory region is unlocked, and a new mapping would be defined on the next lock command for that region. In still another implementation, memory mapping may be performed during memory allocation.

Thereafter, the application program can execute one or more memory access ("mem_access") commands 306 to read from and/or write to addresses in the locked region. Memory location references are given in virtual address space as p+offset, where p is the pointer and offset is a value within the range associated with the handle H.

After the last memory access command 306 is an "unlock" command 308. Unlock command 308 signals the driver that it is no longer necessary to prevent GPU 114(0) from accessing the locked region of graphics memory 116(0); suitable techniques for signaling GPU 114(0) to proceed with such memory accesses are known in the art.

Code fragment 300 is illustrative of conventional command sequences for memory-mapped I/O in a single-GPU system. The specific commands used may depend on a particular API, but in general, the application will allocate and map graphics memory and will also lock the memory before modifying its contents and unlock it after the modifications are complete. Locking advantageously prevents access conflicts or race conditions between reading operations of the GPU and writing operations by the application program, and in some implementations, an application program is allowed to directly access graphics memory only after locking the memory. Unlocking allows the GPU to continue operations that may be stalled while waiting for access to locked memory locations; thus, application programs are generally written such that mapped memory is unlocked when it is not being actively used by the application.

In some embodiments, the driver may dynamically map and unmap regions of graphics memory 116(0) in response to lock and unlock commands.

To use fragment 300 with multiple GPUs in distributed rendering (e.g., SFR or AFR) modes, graphics driver 136 conventionally would execute the allocate, lock, and unlock commands once for each GPU 114. The memory access commands would be executed by duplicate operations accessing each graphics memory 116. Such operations can easily saturate the CPU bus.

On-Demand Memory Synchronization

In accordance with an embodiment of the present invention, code fragment 300 or a similar sequence of instructions is used to provide "on-demand" synchronization of multiple graphics memories 116 managed by graphics driver 136. In one embodiment, graphics driver 136 selects one of the graphics memories, e.g., memory 116(0), as a master graphics memory as noted above. Graphics driver 136 can manage master graphics memory 116(0) in a generally conventional manner; for instance, regions of memory can be allocated, mapped to virtual address space, and directly accessed according to instructions from an application program. Graphics driver 136 manages graphics memory 116(1) as a "mirror" of master graphics memory 116(0), e.g., by initiating DMA block transfer (Blt) operations to copy data from selected locations in master graphics memory 116(0) to corresponding locations in graphics memory 116(1) at appropriate times. The DMA Blt may be a conventional operation and may be managed, e.g., by DMA controller 140. In one embodiment, during execution of unlock command 308 in fragment 300, which signals the end of a group of updates to a region of master graphics memory 116(0), graphics driver 136 instructs DMA controller 140 to transfer data for that region from master graphics memory 116(0) to graphics memory 116(1).

This mirroring technique is reliable provided that master graphics memory 116(0) is not larger than graphics memory 116(1). If this is not the case, then the portion of master graphics memory 116(0) that is used for direct access by application programs 134 can be limited to the size of the smaller graphics memory 116(1), or the smaller graphics memory 116(1) can be selected as the master. In some embodiments, graphics driver 136 may be configured to select a master graphics memory during device startup; the selection process may include determining the capacity of each graphics memory 116 and selecting the smallest graphics memory 116 as the master.

Figure 4:
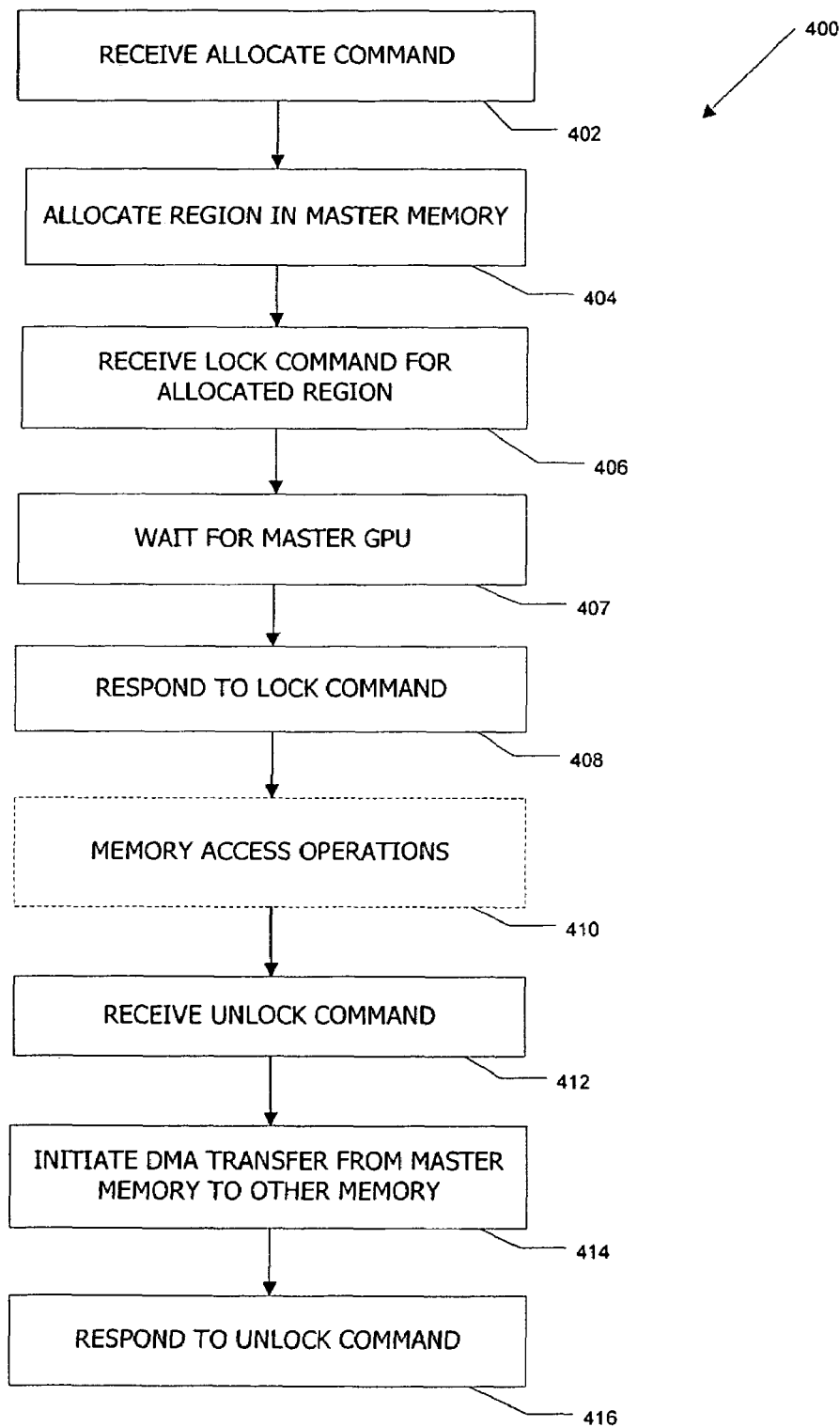
FIG. 4 is a flow diagram of a process for memory synchronization according to an embodiment of the present invention.

FIG. 4 is a flow diagram of a process 400 for on-demand memory synchronization according to an embodiment of the present invention. Process 400 may be implemented, e.g., in a graphics driver 136 of system 100. At step 402, a memory allocation request (e.g., allocate command 302 of FIG. 3) is received. At step 404, space corresponding to the size of the requested allocation is allocated in graphics memory 116(0). For example, region 202 shown in FIG. 2 might be allocated. In some embodiments, mapping of memory locations in region 202 to virtual address space 204 may be performed at system startup, upon allocation of region 202, in response to a separate "map" command (not shown in FIG. 4), or in response to a lock command as described below.

It should be noted that a separate allocation of memory in graphics memory 116(1) is not required; mirroring as described herein provides sufficient protection against conflicting memory use. In addition, a separate mapping of graphics memory 116(1) to virtual address space 204 is not required.

At step 406, a lock command (e.g., command 304 of FIG. 3) referencing the allocated region 202 of master graphics memory 116(0) is received. The lock command indicates that the application program may be ready to modify the content of region 202, and the driver advantageously ensures that before the modification happens, GPU 114(0) is finished operating on the current content of region 202. Thus, at step 407, the driver waits for GPU 114(0) to reach a point in the command stream at which it no longer needs to access the current data stored in region 202.

Any suitable signal for determining when GPU 114(0) has reached this point may be used. In one embodiment, the driver may associate a reference count with allocated memory region 202, and a "current" value of the reference count (current_count) may be maintained in the handle or another data structure representing region 202. GPU 114(0) has a corresponding reference count register that stores a value ref_count. Both current_count and ref_count may be initialized to zero (or any other convenient value). During system operation, when the driver writes any command accessing region 202 to the command stream, it follows that command with an "increment reference count" command that instructs GPU 114(0) to increment the ref_count value in its reference count register; upon writing such a command, the driver increments the current_count value for region 202. The driver can determine whether GPU 114(0) has completed all accesses to the current data in region 202 by comparing the ref_count value in the register with the current_count value. Thus, in one embodiment, step 407 includes waiting for ref_count to become equal to current count.

At step 408, when GPU 114(0) is ready for the application program to access memory region 202, the driver responds to the lock command. If region 202 has not already been mapped to virtual memory, the driver also creates the mapping at this time. A pointer p to the first virtual address in the mapped-to region (e.g., region 206 of FIG. 2) is returned to the application.

At step 410, the application performs memory access operations (e.g., command 306 of FIG. 3) using the pointer p. Depending on implementation, graphics driver 136 might or might not participate in servicing these operations.

At step 412, an unlock command (e.g., command 308 of FIG. 3) is received. In response to the unlock command, at step 414 graphics driver 136 initiates a DMA Blt of data in region 202 to a corresponding region in graphics memory 116(1). In one embodiment, graphics driver 136 provides DMA controller 140 with physical addresses and/or size parameters identifying the source and destination regions, then places a command to execute a DMA Bit into the command stream for processing by GPU 114(0). In another embodiment, graphics driver 136 places the address and/or size parameters into the command stream together with the DMA Bit command, and GPU 114(0) controls the transfer independently of DMA controller 140. In either case, actual execution of the DMA Bit is controlled by GPU 114(0) so that the data transfer happens at a desired point in the rendering command stream.

Execution of the DMA Blt is advantageously synchronized such that both GPUs 114 are at the same point in command stream execution when the transfer occurs. In one embodiment, a hardware-based semaphore, which may be of conventional design, is used to establish synchronization, and the command stream includes commands to each GPU for acquiring and releasing the semaphore; appropriate subdevice masks may be used.

Figure 5:
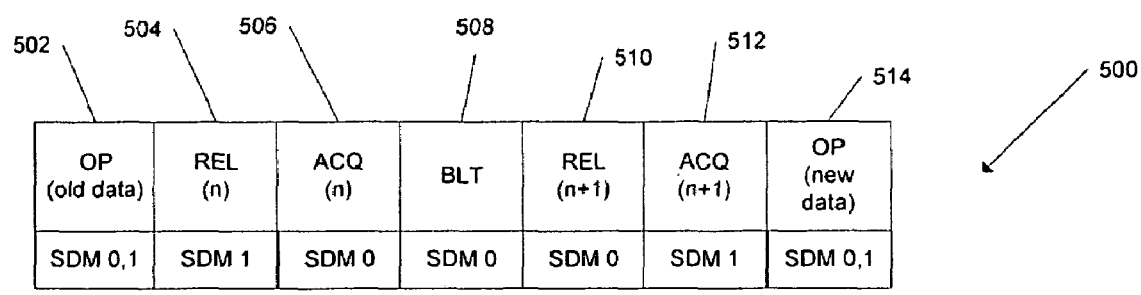
FIG. 5 is an illustration of memory synchronization commands in a command stream according to an embodiment of the present invention.

FIG. 5 illustrates a command stream 500 for initiating a DMA Blt that may be written by the driver at step 412. Each command is accompanied by a subdevice mask (SDM): "SDM 0" indicates that the command is for execution by GPU 114(0) only, "SDM 1" for execution by GPU 114(1) only, and "SDM 0,1" for execution by both GPUs 114. "OP" command 502 represents the last command (e.g., a rendering command, a command to increment the reference count, etc.) that was issued to GPUs 114 prior to receiving the allocate command at step 402. "REL(n)" command 504 instructs GPU 114(1) to release the semaphore with value n and "ACQ(n)" command 506 instructs GPU 114(0) to acquire the semaphore, also with value n. "BLT" command 508 instructs GPU 114(0) to execute the DMA Blt to push the data in region 202 of graphics memory 116(0) to graphics memory 116(1). Next, "REL(n+1)" command 510 instructs GPU 114(0) to release the semaphore with value n+1, and "ACQ(n+1)" command 512 instructs GPU 114(1) to acquire the semaphore with value n+1. OP command 514 represents the next command issued to GPUs 114 after the driver completes step 414 of process 400. Like OP command 502, OP command 514 may be any command. The order of commands may be varied; for instance, the commands with SDM 1 may be grouped together and the commands with SDM 0 may be grouped together preceding or following the SDM 1 group.

The semaphore controlled by command stream 500 provides bidirectional synchronization. Master GPU 114(0) waits at ACQ(ii) command 506 until GPU 114(1) has released the semaphore with value n, then executes the DMA Blt. Thus, the semaphore prevents GPU 114(0) from transferring data to GPU 114(1) before GPU 114(1) has finished processing data previously stored there. After completing the DMA Blt, GPU 114(0) releases the semaphore with value n+1. Similarly, GPU 114(1) releases the semaphore with value n upon reaching REL(n) command 504, then waits at ACQ(n+1) command 512 until GPU 114(0) has released the semaphore with value n+1, indicating that the DMA Blt is complete. Thus, the same semaphore also prevents GPU 114(1) from performing operations on old data that were intended to be performed on new data.

It will be appreciated that this semaphore-based synchronization technique is illustrative and that other synchronization techniques may also be used.

At step 416, graphics driver 136 responds to the unlock command, e.g., by returning confirmation or status information to the application. In some embodiments, the virtual memory for region 202 may be unmapped. Thereafter, the application can again lock region 202 (or some other allocated and mapped region) and perform further memory access operations in the manner described above. Thus, memory-mapped I/O operations are performed in master graphics memory 116(0), then mirrored to graphics memory 116(1) using a DMA Blt when the memory region is unlocked.

Depending on the size of region 202, the DMA Blt operation might involve copying a large quantity of data, only a small fraction of which might actually have been modified. For instance, a relatively large region (e.g., 16 MB) of graphics memory 116(0) might be allocated to store a texture map, and a subsequent update to the texture map might modify only a few 4 KB pages within the 16 MB region. Since the handle used by the application program for accessing the texture map references the entire 16 MB region, process 400 would result in a DMA Blt of size 16 MB any time one or more pages is modified. While this is generally preferable to transferring the same data from the CPU multiple times, some embodiments of the present invention provide further optimization.

In one embodiment, the data transfer operation can be optimized by using "dirty" bits that are maintained by CPU 102 (e.g., in address directory 142) for identifying pages in virtual address space 204 that have been modified. As is known in the art, many common microprocessor architectures (e.g., Intel Pentium and x86 processors) support virtual page tables that provide dirty bits. Each time data is written to a page, the dirty bit for that page is set to a "modified" value (e.g., 1). Most operating systems (e.g., Microsoft Windows) provide function calls that can be invoked to reset the dirty bits to an "unmodified" value (e.g., 0) for a group of one or more pages and to check the current value of the dirty bits for that group of pages. If a write operation to a page in the group occurs between execution of the reset function and the check function, the dirty bit for that page will have its modified value, and otherwise, the dirty bit will have its unmodified value.

Figure 6:
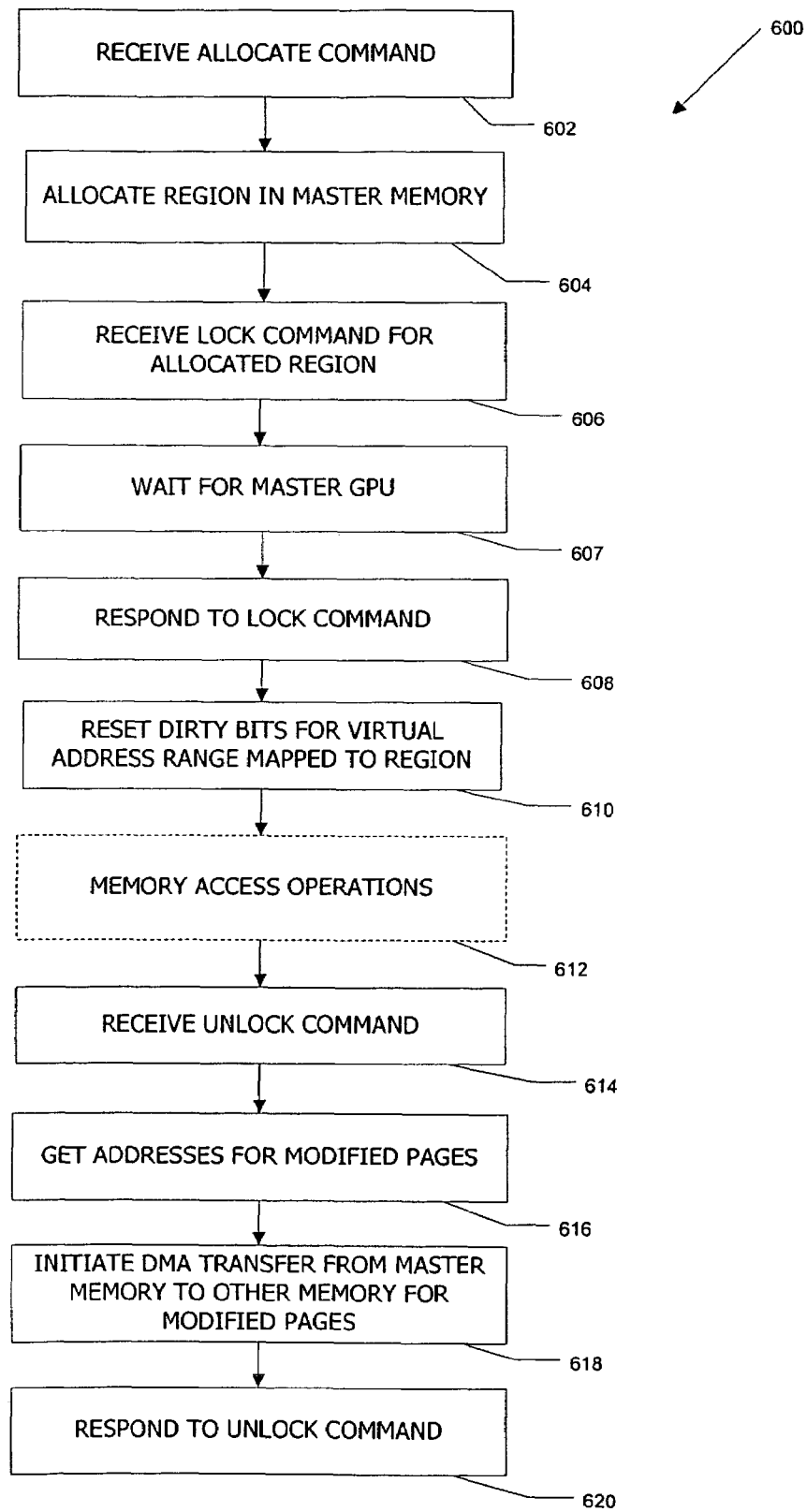
FIG. 6 is a flow diagram of a process for memory synchronization according to an alternative embodiment of the present invention.

FIG. 6 is a flow diagram of a process 600 for memory synchronization according to an alternative embodiment of the present invention. In process 600, graphics driver 136 exploits dirty bits to identify pages in master graphics memory 116(0) that were modified during a group of updates and to transfer only the modified pages.

At step 602, a memory allocation command is received, and at step 604, space corresponding to the request is allocated in master graphics memory 116(0). These steps may be generally similar to steps 402 and 404 of process 400 described above and may or may not include mapping the allocated region (e.g., memory region 202 shown in FIG. 2) to a range of virtual addresses. As in process 400, allocation or mapping of memory in graphics memory 116(1) is not required.

At step 606, a lock command referencing the allocated region 202 of master graphics memory 116(0) is received. At step 607, the driver waits for GPU 114(0) to reach a point in the command stream at which it no longer needs to access the current data stored in region 202. At step 608, when GPU 114(0) is ready for the application program to access memory region 202, the driver responds to the lock command. These steps may be generally similar to steps 406-408 of process 400 described above, and step 608 may include creating a virtual memory mapping for region 202.

At step 610, graphics driver 136 resets the dirty bits for virtual addresses corresponding to region 202. In some embodiments, resetting the dirty bits involves invoking an operating system function. For instance, the Microsoft Windows operating system provides a "ResetWriteWatch" function that receives the base address and size of the region whose dirty bits are to be reset, and in one embodiment, graphics driver 136 invokes this function. More generally, resetting the dirty bits may include any operation that sets the dirty bit for each page in the mapped-to region 206 of virtual address space 204 to a state (e.g., a value of 0) indicating that the page has not been modified. After resetting the dirty bits, the driver returns to the application a pointer p identifying the first virtual memory address for region 202.

Thereafter, at step 612, the application performs memory access operations using the pointer p, as described above. For each write operation performed during step 612, the dirty bit for each target page is set to a state (e.g., a value of 1) indicating that the page has been modified. In some embodiments, the dirty bit is set to its modified state for each page that is the target of a write operation, regardless of whether the new data written to that page is different from or the same as old data stored there. Modification of the dirty bit in response to a write operation is an automatic feature of some operating system (e.g., Microsoft Windows), and graphics driver 136 is not required to participate in any memory access operations.

At step 614, an unlock command is received. In response to the unlock command, at step 616, graphics driver 136 reads the dirty bits for the pages in mapped-to region 206 to determine which pages were modified. For instance, the Microsoft Windows operating system provides a "GetWriteWatch" function that returns a list of addresses of pages that were modified, and in one embodiment, graphics driver 136 invokes this function. More generally, identifying modified pages may include any operation that reads the dirty bits for pages in mapped-to region 206 and generates a list of addresses for pages that were modified.

At step 618, graphics driver 136 initiates a DMA Blt of data for each modified page in region 202 of master graphics memory 116(0) to a corresponding region in graphics memory 116(1). In some embodiments, a separate DMA Blt may be initiated for each modified page. In other embodiments, graphics driver 136 may identify groups of contiguous pages that were modified and initiate one DMA Blt for each group. In still other embodiments, graphics driver 136 may be configured with a minimum block size (e.g., in number of pages) for transfer operations and may initiate a DMA Blt for each block of pages that contains at least one unmodified page. The minimum block size may be selected based on an efficiency tradeoff between using a large number of small DMA Blt operations or a smaller number of large DMA Blt operations; those skilled in the art with access to the present teachings will be able to select an appropriate minimum size for a given system configuration.

Initiating the one or more DMA Bits at step 618 advantageously includes instructing GPUs 114(0) and 114(1) to synchronize with each other, e.g., using semaphores as shown in FIG. 5. Where multiple DMA Bits are to be performed, multiple instances of BLT command 508 may be inserted into command stream 500 between ACQ(n) command 506 and REL(n+1) command 510.

At step 620, graphics driver 136 unlocks the allocated region 202, e.g., by instructing GPU 114(0) to discontinue stalling of operations that access region 202.

Thereafter, the application can again lock region 202 (or some other allocated region) and perform additional memory access operations. Any such operations will be performed on master graphics memory 116(0), then mirrored to graphics memory 116(1) as described above.

It will be appreciated that processes 400 and 500 are illustrative and that variation and modification are possible. Steps described as sequential may be executed in parallel, order of steps may be varied, or steps may be modified or combined. The particular commands used by the graphics driver to determine when a DMA Bit should be initiated for a particular region may differ from those described herein; for example, in embodiments where direct CPU access to a peripheral device memory is permitted only when access by a peripheral co-processor is blocked, any blocking or unblocking event detectable by the peripheral device driver can be used as an indicator that a DMA Bit should be initiated. In other embodiments, application programs may be modified to instruct the graphics driver to initiate a DMA Blt at an appropriate time.

In addition process 600 does not require the use of dirty bits. Any mechanism for determining which pages (or other relatively small units of memory) have been targets of a write operation may be substituted. For example, in one embodiment, write operations targeting graphics memory may be serviced by the graphics driver, which can assemble a list of addresses of targeted pages.

FURTHER EMBODIMENTS

While the invention has been described with respect to specific embodiments, one skilled in the art will recognize that numerous modifications are possible. For instance, the invention is not limited to use of DMA Blt or any other particular technique for transferring data from memory associated with one GPU to memory associated with another GPU. Any suitable data transfer technique that avoids saturation of the CPU bus may be substituted. In some embodiments, the graphics subsystem may be configured with a DMA controller or other suitable circuitry for managing data transfers between graphics memories. Such circuitry may be integrated with one or more of the GPUs or provided in a separate chip within the graphics processing subsystem.

In other embodiments, mirroring is performed only for certain sections of the graphics memory. For example, as noted above, the master graphics memory with which the CPU directly interacts might be larger than a graphics memory associated with the other GPU. In such cases, mirroring could be limited to those addresses in the master graphics memory for which corresponding addresses exist in the second graphics memory; alternatively, some other mapping between selected sections of the master graphics memory and the other graphics memory might be defined. As another example, different regions in each graphics memory might be identified as "broadcast" and "unicast" regions. Broadcast regions would be updated in a master graphics memory, with the updates being mirrored to the other graphics memories as described herein; unicast regions of each graphics memory would be separately managed and updated without the use of mirroring.

In still other embodiments, the driver might be configurable to perform the mirroring operations or not, depending on a currently active rendering mode. For example, some embodiments might support both distributed and independent rendering modes. In a distributed rendering mode (e.g., the SFR or AFR modes described above), the GPUs operate to generate images for the same display device and would typically use the same input data; in an independent rendering mode, the GPUs operate to generate possibly unrelated images for different display devices. In the latter mode, the GPUs might require different data, and mirroring would not be desirable. In such embodiments, the graphics driver can be configured to enable or disable the mirroring operations based on the current rendering mode.

In addition, while the embodiments described herein refer to two GPUs, each with its own memory, the techniques described can be extended to systems with any number of GPUs and to systems in which some of the GPUs share all or part of their graphics memory with other GPUs. In general, the memory associated with any one of an arbitrary number of GPUs can be selected as a master graphics memory for purposes of data distribution, and the CPU would interact with the master graphics memory as described above. At appropriate times (e.g., at the end of a group of updates), data from the master graphics memory would be transferred to each of the other graphics memories in the system similarly to the manner described above. The mirroring transfers might be accomplished by using a broadcast mode from the master graphics memory to the other graphics memories, by sequential transfers to each of the other graphics memories, or in a daisy-chain fashion, with the master graphics memory transferring data to a second graphics memory, which would forward the same data to a third graphics memory, and so on.

Further, while the present description makes reference to interaction of applications or application programs with the graphics driver and graphics memories, it is to be understood that any process or program executing on a central processor (including, e.g., operating system processes or programs) may make use of graphics functionality by interacting with the graphics driver in a manner generally similar to that described above.

Moreover, although the present description refers specifically to a graphics processing system with multiple graphics processors, those of ordinary skill in the art with access to the present teachings will appreciate that the techniques used herein may be applied to other types of peripheral processing systems that provide multiple co-processors such as audio subsystems.

Peripheral systems embodying the present invention may be incorporated into a variety of devices, including general purpose computer systems, video game consoles and other special purpose computer systems, DVD players, handheld devices such as mobile phones or personal digital assistants, and so on.

Computer programs incorporating various features of the present invention may be encoded on various computer readable media for storage and/or transmission; suitable media include magnetic disk or tape, optical storage media such as compact disk (CD) or DVD (digital versatile disk), flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download). Alternatively, some or all features of the present invention may be implemented in hardware instead of or in addition to software.

Thus, although the invention has been described with respect to specific embodiments, it will be appreciated that the invention is intended to cover all modifications and equivalents within the scope of the following claims.

What is claimed is:

1. In a computer system, a method for managing memory in a peripheral processing subsystem including a plurality of peripheral co-processors and a plurality of memories, each memory being associated with a different one of the peripheral co-processors, the method comprising:
    selecting one of the plurality of memories as a master memory, the master memory being associated with a first one of the plurality of peripheral co-processors;
    identifying a region of the master memory as being modifiable by a process executing on a central processor of the computer system;
    detecting completion of a modification to the modifiable region; and
    in response to detecting completion, initiating a transfer of data in the modifiable region of the master memory to a corresponding region of a second memory associated with a second one of the peripheral co-processors.

2. The method of claim 1 wherein the peripheral processing subsystem is a graphics processing subsystem.

3. The method of claim 1 wherein the modifiable region includes a plurality of pages of memory and the act of initiating a transfer of data includes:
    initiating a transfer of the data for all of the pages in the modifiable region.

4. The method of claim 1 wherein the modifiable region includes a plurality of pages of memory and wherein act of initiating a transfer of data includes:
    determining which of the plurality of pages were modified by the modification; and
    selectively initiating a transfer of the data for the modified pages.

5. The method of claim 1 wherein the act of initiating a transfer includes:
    instructing a DMA controller of the computer system to perform a block transfer from the modifiable region of the master memory to the corresponding region of the second memory.

6. The method of claim 4 wherein:
    the act of identifying includes clearing a dirty bit associated with each of the pages in the modifiable region; and
    the act of determining includes examining the dirty bits.

7. The method of claim 1 wherein the act of identifying includes:
    receiving a lock command from the process executing on the central processor, the lock command including a reference to the modifiable region of the master memory.

8. The method of claim 7 wherein the act of detecting completion includes:
    receiving an unlock command from the process executing on the central processor, the unlock command including a reference to the modifiable region of the master memory.

9. The method of claim 8 further comprising:
    in response to the lock command, instructing the first peripheral co-processor to postpone accessing the modifiable region of the master memory; and
    in response to the unlock command, instructing the first peripheral processor to stop postponing accessing the modifiable region of the master memory.

10. The method of claim 1 further comprising:
    prior to the act of identifying the region, mapping the modifiable region of the master memory to a virtual memory space, thereby enabling direct access by the process executing on the central processor to the modifiable region.

11. The method of claim 10 wherein the corresponding region of the second memory is not mapped to the virtual memory space.

12. The method of claim 1 wherein the act of identifying the region includes:
    mapping the modifiable region of the master memory to a virtual memory space, thereby enabling direct access by the process executing on the central processor to the modifiable region.

13. The method of claim 12 wherein the corresponding region of the second memory is not mapped to the virtual memory space.

14. The method of claim 1 wherein the act of selecting includes:
    selecting a smallest one of the plurality of peripheral memories as the master memory.

15. A peripheral subsystem for a computer system, the peripheral subsystem comprising:
    a plurality of peripheral co-processors operable in parallel;
    a master memory associated with a first one of the peripheral co-processors;
    a second memory associated with a second one of the peripheral co-processors; and
    a driver module configured to enable communication between a process executing on a central processor of the computer system and the plurality of peripheral co-processors, the driver module including a memory management unit configured to manage the master memory and the second memory in response to memory commands received from the process,
    wherein the memory management unit is configured to enable the process to access a modifiable region of the master memory and to initiate a direct data transfer from the modifiable region of the master memory to a corresponding region of the second memory.

16. The peripheral subsystem of claim 15 wherein the memory commands receivable from the process include a lock command indicating a beginning of an update to the modifiable region, and wherein the memory management unit is further configured to lock the modifiable region of the master memory, thereby inhibiting the first peripheral co-processor from accessing the region of the master memory, in response to the lock command.

17. The peripheral subsystem of claim 16 wherein the memory commands receivable from the process further include an unlock command indicating an end of an update to the modifiable region, and wherein the memory management unit is further configured to initiate the direct data transfer in response to the unlock command.

18. The peripheral subsystem of claim 17, wherein the memory management unit is further configured to unlock the region of the master memory in response to the unlock command.

19. The peripheral subsystem of claim 15 wherein the co-processors are graphics processors.

20. A computer program product comprising:
   a computer readable storage medium encoded with program code for managing memory in a peripheral processing subsystem including a plurality of peripheral co-processors and a plurality of peripheral memories, each memory being associated with a different one of the peripheral co-processors, the program code including:
      program code for selecting one of the plurality of peripheral memories as a master memory, the master memory being associated with a first one of the plurality of peripheral co-processors;
      program code for identifying a region of the master memory as being modifiable by a process executing on a central processor of the computer system;
      program code for detecting completion of a modification to the modifiable region; and
      program code for initiating, in response to detecting completion, a transfer of data in the modifiable region of the master memory to a corresponding region of a second memory associated with a second one of the peripheral co-processors.

21. The computer program product of claim 20 wherein the program code for initiating includes:
   program code for initiating a transfer of the data for each of a plurality of pages in the modifiable region.

22. The computer program product of claim 20 wherein the program code for initiating includes:
   program code for determining which of the plurality of pages were modified by the modification; and
   program code for selectively initiating a transfer of the data for the modified pages.

* * * * *